(No Model.)  2 Sheets—Sheet 2.

S. P. GODDARD.
METHOD OF REDUCING CORN IN THE STALK AND SEPARATING THE KERNELS.

No. 290,571. Patented Dec. 18, 1883.

WITNESSES
Edwin L. Yewell.
Chas. H. Baker.

Sextus P. Goddard,
INVENTOR

H. J. Tunis
Attorney

UNITED STATES PATENT OFFICE.

SEXTUS P. GODDARD, OF WORCESTER, MASSACHUSETTS.

METHOD OF REDUCING CORN IN THE STALK AND SEPARATING THE KERNELS.

SPECIFICATION forming part of Letters Patent No. 290,571, dated December 18, 1883.

Application filed November 6, 1883. (No model.)

*To all whom it may concern:*

Be it known that I, SEXTUS P. GODDARD, a citizen of the United States, residing at Worcester, in the county of Worcester and State of Massachusetts, have invented certain new and useful Improvements in Methods of Reducing Corn in the Stalk and Separating the Kernels, of which the following is a specification, reference being had therein to the accompanying drawings.

My invention has relation to a new and useful method of reducing and separating corn from the stalk, husk, and cob; and the object is to take the stalk corn and so treat it at one operation that the grains will be separated from the cob, and at the same time the stalk, husk, and cob are cut up or comminuted and ready for use as stock-food—ensilage; or, in this fine condition it may be plowed into the soil as a fertilizer without any further treatment; and to these ends the novelty consists in the method hereinafter described, and particularly set forth in the claims.

In carrying out my invention the result is accomplished by means of the devices shown in the accompanying drawings; but I do not wish to be understood as limiting myself to the means shown, as any mechanism which will produce the same result may be used.

Figure 1:
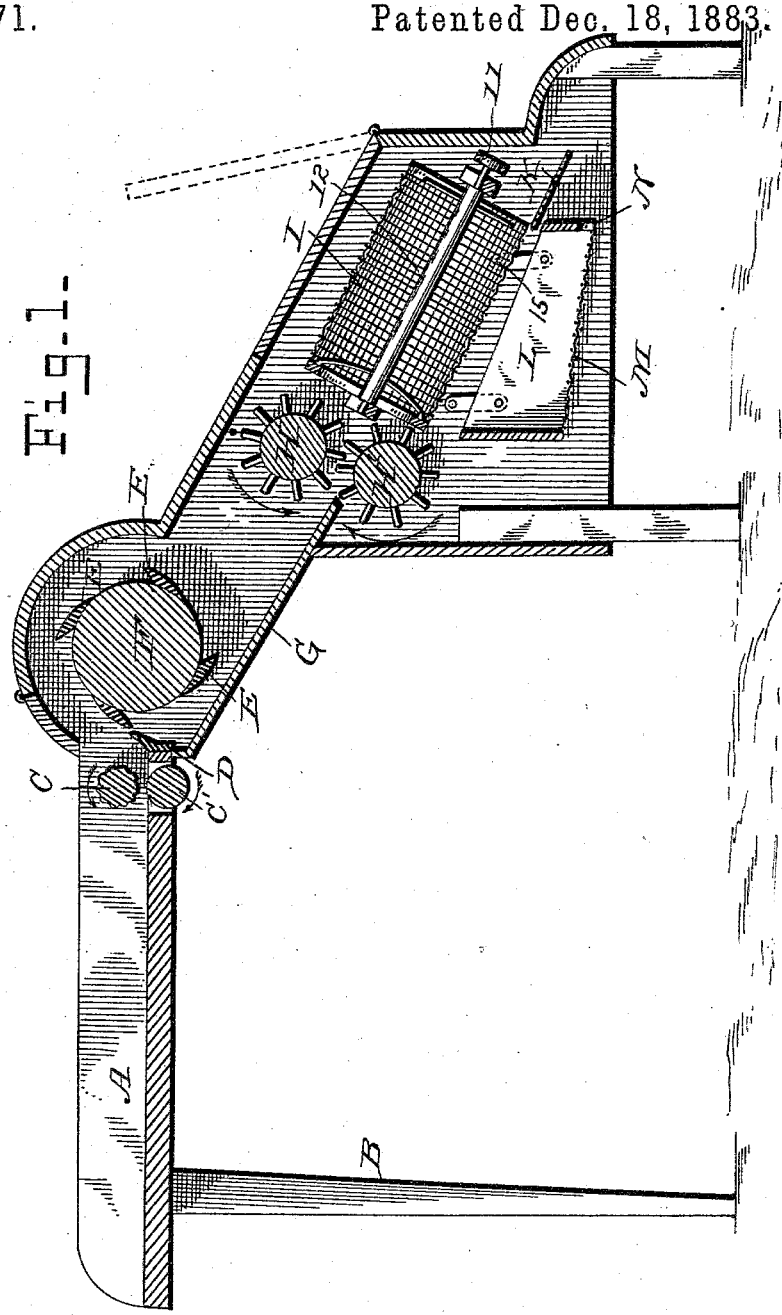
Figure 2:
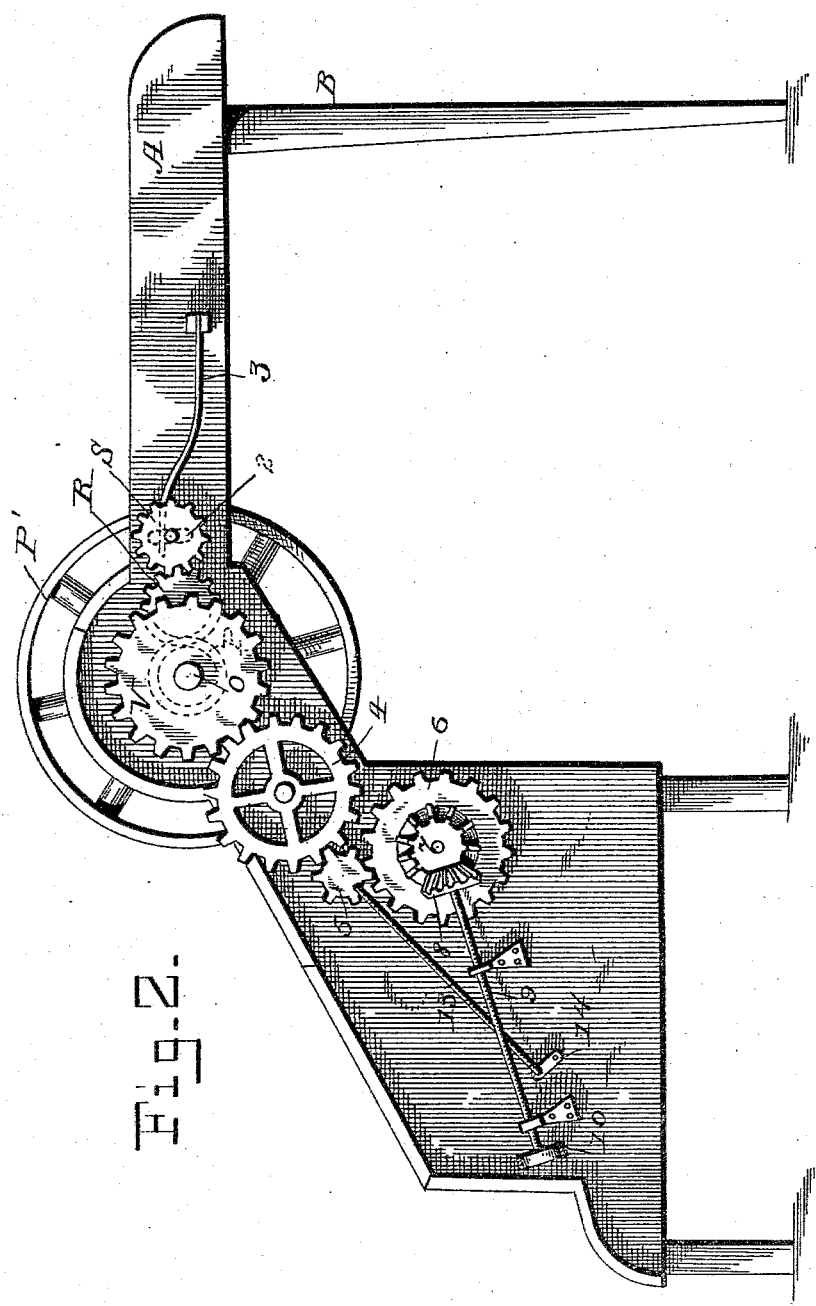

Figure 1 is a longitudinal vertical section of a machine adapted to carry out my invention, and Fig. 2 is a side elevation of the same.

A is a feed-trough supported at one end by legs, one of which is shown at B.

C C' are the feed-rollers, the upper one, C, being corrugated, and both driven by the ordinary gears.

D is the cutter-bar rigidly secured to the base, and E are the cutters or knives secured to the cylinder F, so that as the latter rotates the material as it is fed by the rollers C C' is forced over the cutter-bar D, and the knives E cut it into suitable lengths, and the cut pieces fall on the incline G, and are thence fed to the toothed cylinders H H', which thoroughly break up the pieces and discharge them into the inclined rotating screen I. The grain corn then falls through said screen, while the stalks, cobs, and husks pass out the lower end of the screen onto the incline K, and thence on the floor or ground.

L is a shaking-screen having inclined screen-bottom M, and as the grain corn and chaff or refuse fall into it from the rotating screen, the shaking motion sifts all the dirt or foreign matter through, while the clean grain is carried forward and discharged through the opening N into a box or bin placed there to receive it. It will thus be seen that as the stalks and ears with the husks on are fed to the cutters they cut the stalks, and also the ears, husks, and cobs into small disks. This in the first place practically shells the corn in addition to cutting the cobs, husks, and stalks, and as the pieces of cob pass between the toothed cylinders H H', what few remaining grains may be attached are separated by the thrashing operation of said cylinders.

The knife-cylinder F is mounted on a shaft, O, one end of which is provided with a band or fly-wheel, P', and on the other end is a small gear, P, giving motion, through the idler R, to the gear S, secured to the upper feed-roller, C. The shaft of this feed-roller has a vertical play in the slot 2, to facilitate feeding the material, and a spring, 3, serves to keep the roller to its work.

4 is an idler, which receives motion from the gear V on the shaft O, and communicates it to the gear 5, attached to the toothed cylinder H, and the said gear 5 in turn meshes with a larger gear, 6, on the other toothed cylinder, H'.

To the face of the gear 6 is secured an angle-gear, 7, meshing with a similar gear, 8, on the shaft 9, the lower end of which is provided with a band-pulley, 10, by means of which a rotary motion is given to the pulley 11 on the shaft 12 of the revolving screen I, said pulleys 10 and 11 being connected by a belt. (Not shown.)

13 is a pitman eccentrically connected to the face of the gear 5, so as to give a shaking motion to the arm 14, secured to a rock-shaft, 15, upon which the shaking screen L is mounted.

It will thus be seen that the machine may be placed in the field, and the stalks of corn, being first cut down a few inches from the ground, may then be fed in suitable bunches to the feed-rollers C C' and cutters, which cut the stalks, ears, and husks into small pieces, and, as above stated, this cutting operation removes the greater portion of the grain corn from the cob, and the remaining adhering grains are entirely removed by the thrashing action of the cylinders H H', and the mass then passes into the revolving screen I, where the corn and chaff or dirt pass through said screen and fall into the shaker L, while the stalks, husks, and cobs pass out the lower end upon the incline K, thence to the ground. The grain corn and chaff in falling into the shaker L is continually agitated, which sifts the chaff through the bottom, leaving the corn clean and clear to be discharged through the opening N.

Having thus fully described my improved method of separating corn, what I claim as new and useful, and desire to secure by Letters Patent of the United States, is—

1. The method herein described of reducing and separating corn in the stalk at a single operation, which consists, first, in cutting up the ears, husks, and stalks; second, in removing the remaining grain from the cobs; and, finally, in separating the clean grain from the stalks, cobs, and husks, as set forth.

2. The method herein described of reducing and separating corn in the stalks, which consists in cutting the corn, stalks, cobs, and husks at a single operation, and then removing the remaining grain from the cobs, as set forth.

In testimony whereof I affix my signature in presence of two witnesses.

SEXTUS P. GODDARD.

Witnesses:
CHAS. H. BAKER,
H. J. ENNIS.